Sept. 6, 1960 M. T. HOFFMAN 2,951,278
ELASTIC NON-WOVEN FABRIC
Filed Jan. 27, 1958
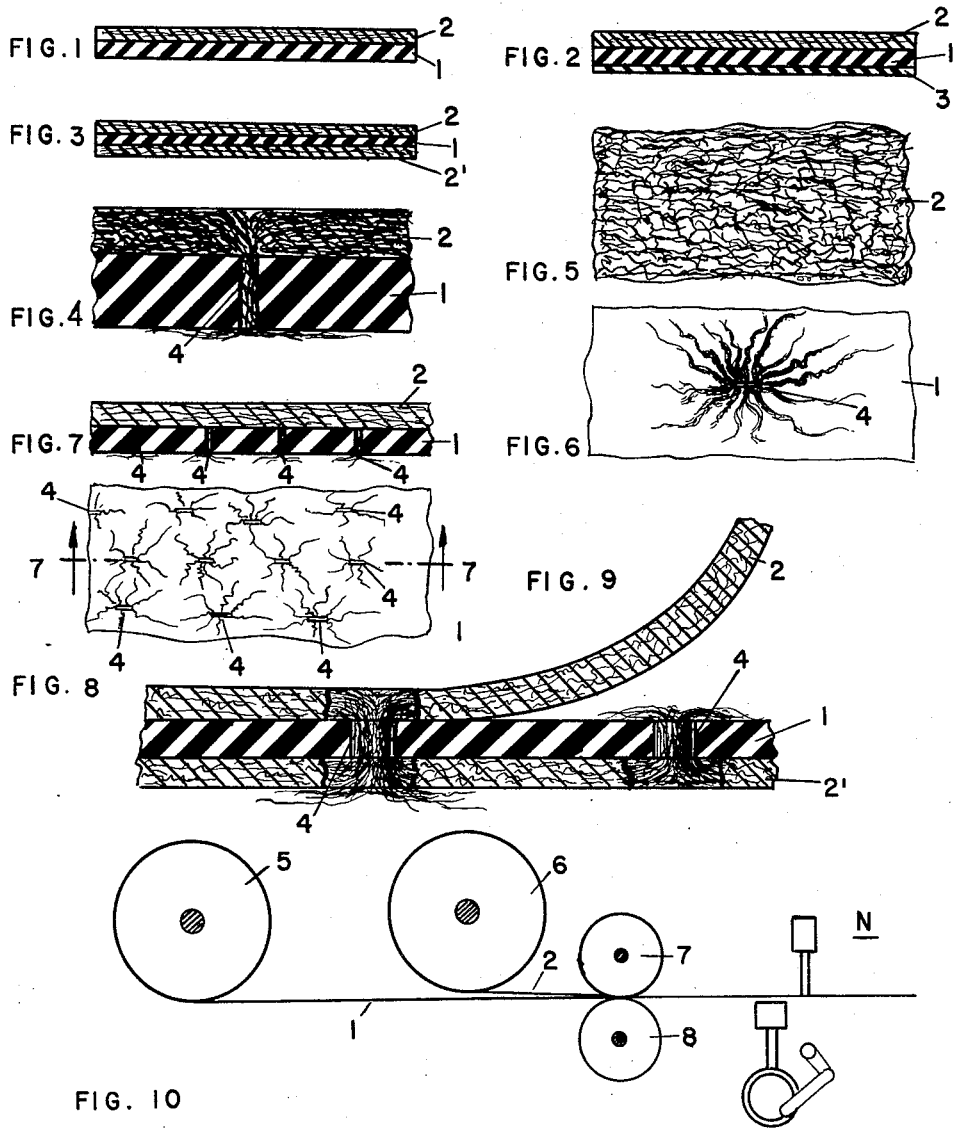
INVENTOR:
Manfred T. Hoffman Patented Sept. 6, 1960

2,951,278
ELASTIC NON-WOVEN FABRIC
Manfred T. Hoffman, 187 High St., Newburyport, Mass.

Filed Jan. 27, 1958, Ser. No. 711,262

1 Claim. (Cl. 28—79)

This invention relates to elastic non-woven laminates, and to methods of producing the same.

It is one object of this invention to provide improved materials comprising a stretchable base sheet of vulcanized rubber, or an equivalent elastomer, which is lined with fibers.

Wearing apparel and like products made of rubber do not slide freely over the skin, and are therefore difficult to adjust and to remove. Direct contact of such apparel with the skin produces a cold and clammy feeling. Such apparel also tends to inhibit access of air to the pores in the skin and traps perspiration tending to condense on its inner surfaces. These and other limitations and drawbacks inherent in wearing apparel and other articles made of sheet rubber, liquid rubber latex and synthetic elastomers make it often necessary or desirable to provide such articles with a lining of fibers.

Prior art methods of attaching a lining of fibers to a sheet of rubber, or of an equivalent elastomer, include the use of elastic cements or adhesives such as, for instance, liquid rubber latex, as a bonding medium for the fibers. This method of attaching fibers to a base sheet is relatively difficult to be carried into effect, and the fiber-lined materials produced by this method are not very satisfactory because the fibers with which the base sheet is lined have generally a tendency to come off.

It is, therefore, another object of this invention to provide laminates comprising an elastic base sheet and a fibrous lining which laminates are not subject to the limitations and drawbacks of laminates of the same description which have been known heretofore.

Another object of the invention is to provide laminates of the aforementioned description which lend themselves to be manufactured more readily than comparable prior art laminates.

Another object of the invention is to provide fiber-lined base sheets of synthetic elastomers or of natural rubber having various degrees of stretchability depending upon the nature of the fibers used for lining the base sheet and, to some extent, upon the average spacing in which the fibers are attached to the base sheet.

Another object of the invention is to provide elastic non-woven laminates stretchable in one direction, or in two directions, and having in a general way the same properties as elastic materials made of threads around which cotton or silk fibers are woven.

Further objects and advantages of the invention will become more apparent as the following description proceeds, and the features of novelty characterizing the invention will be pointed out with particularity in the claim annexed to and forming part of this specification.

The laminates manufactured according to my invention comprise a base sheet of rubber or equivalent synthetic elastomer and a lining layer of a suitable non-woven fabric which is attached to the base sheet at spaced points only, as by the action of a needle loom.

For a better understanding of the invention reference may be had to the accompanying drawing in which Fig. 1 is a diagrammatic section across a laminate embodying the invention;

Fig. 2 is a diagrammatic section across another laminate embodying the invention;

Fig. 3 is a diagrammatic section across still another laminate embodying the invention;

Fig. 4 is a section across the laminate of Fig. 1 drawn on a considerably larger scale and showing the way in which the fibrous lining web is attached to the base sheet made of an elastomer;

Fig. 5 is a top plan view of the structure shown in Fig 4;

Fig. 6 is a bottom view of the structure shown in Fig. 4;

Fig. 7 is a section along 7—7 of Fig. 8 and shows the structure of Fig. 4 on a relatively smaller scale to illustrate several points of attachment of the web to the base sheet of rubber or the like elastomer;

Fig. 8 is a bottom view of the structure of Fig. 7;

Fig. 9 is a cross-section of the same laminate as shown in Fig. 3 and is drawn on a considerably larger scale and illustrates the way in which a sheet of rubber or like elastomer may be sandwiched between, and attached to, layers of a non-woven fabric; and Fig. 10 is a diagram illustrating the process steps involved in producing a laminate as shown in Fig. 1.

Referring now to the drawing, and more particularly to Figs. 1 to 3, inclusive, numeral 1 has been applied to indicate a stretchable base sheet of an elastomer, e.g. vulcanized rubber, and numeral 2 has been applied to indicate a non-woven lining layer or web of relatively loosely interlocked relatively stretchable fibers superimposed upon base sheet 1. Base sheet 1 is pierced at a plurality of points 4—as best shown in Fig. 7—without removal of base sheet material at said points. Points 4 define a plurality, or a system, of small slits which are self-closing by virtue of the mechanical properties of vulcanized rubber and equivalent elastomers. Lining layer 2 is directly attached to base sheet 1 only at the spaced points 4. This is achieved by insertion of the constituent fibers of lining layer 2 into the small slits at the points 4 and clamping of the fibers inside of these slits. As shown in Fig. 4 the fibers of lining layer 2 are inserted into one of the slits in base sheet 1 at one of the points 4 and extend through and beyond the slit to the side of base sheet 1 opposite to lining layer 1. The fibers of lining layer 1 which are pulled through the slit at 4 are spread out on the side of base sheet 1 opposite to lining layer 2. It will be understood that this way of spot attachment of spaced points of sheet 2 to sheet 1 implies a limited strength of attachment per point. If the density of points of direct attachment of lining layer 2 to base sheet 1 is sufficiently large, layer 2 and sheet 1 are then combined to form an integral laminate which will not split under normal, and even under severe, conditions of wear and tear. The fibers of lining layer 2 other than those directly attached to base sheet 1 are indirectly attached to base sheet 1 by interlocking with the fibers directly attached to base sheet 1. It will be understood that the degree of stretchability of the composite product, or laminate, depends upon the stretchability of the fibers of which the lining layer is made. The fibers of which the lining layer is made must be sufficiently stretchable to permit joint stretching of base sheet 1 and of lining layer 2 with concomitant increase of the spacing between points 4. Fibers which have some bent, or curl, enable to achieve some degree of stretchability which is quite sufficient for many purposes or applications. Where it is desired to achieve a particularly high degree of stretchability synthetic fibers known as "stretchable" fibers should be used to form web 2.

A certain degree of stretchability may be achieved by making up web 2 of fibers known by the trade mark Dacron of E. I. du Pont de Nemours and Company. For higher degrees of stretchability fibers may be used known by the trade marks Fluflon of Marionette Mills, Inc., or Helenca of Heberlein & Co. The two last referred-to products are synthetic pre-twisted and pre-set substantially helical fibers.

Where it is desired to achieve so-called one-way stretching characteristics, i.e. stretchability in one direction only, or preponderantly in one direction, a lining layer 2 may be used the constituent fibers of which are preponderantly oriented in one direction, imparting preponderant stretchability to the finished laminated product in one direction.

Normally the slits at points 4 of base sheet 1 are closed. They open to some extent when the composite material or laminate is being stretched. This provides some degree of ventilation which may be desirable. Where a higher degree of ventilation is sought than that achieved through the slits at points 4, additional perforations may be added to the fine slits at points 4, as commonly known in the art. It will be understood that conventional ventilating perforations are quite different from the lining attachment slits at points 4 inasmuch as the former are small normally open generally circular punchings resulting from removal of base sheet material at the points where the punchings were made.

The embodiment of the invention shown in Fig. 2 is a laminate which comprises a base sheet 1 and a lining layer 2 identical with base sheet 1 and lining layer 2 of the embodiment shown in Figs. 1 and 4 to 7 and described in connection therewith. Sheet 1 and layer 2 are attached to each other in the same way as above described. The laminate shown in Fig. 2 comprises, in addition thereto, a backing layer 3 of a stretchable elastomer arranged on the side of base sheet 1 opposite to lining layer 2. Backing layer 3 is bonded to base sheet 1, and bonds the ends of the fibers of lining layer 2 situated on the side of base sheet 1 opposite lining layer 2 to base sheet 1.

The fibers which are being pulled through the slits situated at points 4 tend to spread, or fan out, substantially radially around each slot 4 as indicated in Fig. 8 and shown on a considerably larger scale in Fig. 6. The spreading of fibers on the side of base sheet 1 opposite to lining layer 2 greatly increases the strength of attachment of lining layer 2 to base sheet 1 which is inherent in the clamping or pinching action of the slots at points 4. In the embodiment of the invention shown in Fig. 2 the fibers of web 2 which are pulled through base sheet 1 and spread out on the surface of base sheet 1 opposite to web 2 are much like the roots of a minute plant firmly attached to base sheet 1 and rooted in backing layer 3. This makes the structure of Fig. 2 particularly wear and tear resistant.

It will be apparent that the structure of Fig. 2 permits to use webs made up of fibers of any desired length, as long as their stretchability is consistent with the degree of stretchability which the resulting laminate is desired to have. In prior art stretchable laminates comprising rubber sheets lined with fibers by means of adhesives the fibers had to be very short in order not to unduly limit the stretchability of the composite product.

The backing layer 3 may be sprayed on the base layer 1 or otherwise deposited thereon by means well known in the art.

Referring now to Fig. 3, the embodiment of the invention shown therein differs from the embodiment of Fig. 1 only by the addition of a second lining layer 2'. In other words, the base sheet 1 is sandwiched between two lining layers 2 and 2' of which both are formed by a suitable non-woven fabric. Base sheet 1 is pierced at spaced points without removal of base sheet material at said points which define a first system of small slits. Base sheet 1 is further pierced at other spaced points without removal of base sheet material at said other points which define a second system of small slits. Lining layers 2, 2' are directly attached to base sheet 1 only at the points where base sheet 1 is pierced. One of the pair of lining layers 2, 2' is attached to base sheet 1 by insertion of fibers of said one of said pair of lining layers into said first system of slits, and the other of said pair of lining layers 2, 2' is attached to base sheet 1 by insertion of fibers of said other of said pair of lining layers 2, 2' into said second system of slits.

The above described structure has been illustrated in Fig. 9 on a larger scale. Fig. 9 shows the structure generally in cross-section, but at two points 4 where the base sheet 1 has slits the inside of two slits and adjacent portions of lining layers 2, 2' have been shown in elevation. Reference numeral 4 at the right side of Fig. 9 indicates how some of the fibers of the lower lining layer 2' are pushed through a slit in base sheet 1 and spread out on the side of base sheet 1 opposite to lining layer 2'. The right end of the upper lining layer 2 is shown in a raised position to clearly expose to view the spreading of fibers of layer 2' on the upper side of base sheet 1. Reference numeral 4 on the left side of Fig. 9 indicates how some fibers of the upper lining layer 2 are pushed through a slit in base sheet 1 and through the lower lining layer 2' and spread out on the side of lining layer 2' opposite base sheet 1, thus effecting a firm interlock of all three components 1, 2, 2' of the laminate. The process steps resulting in points of attachment of layer 2' only to base sheet 1, i.e. stitches of the kind shown on the right of Fig. 9, may be dispensed with where stitches across all three components 1, 2, 2' of the laminate are sufficient to establish the required strength. The kind of stitches shown at the left of Fig. 9 are of great strength because the fibers which are displaced from layer 2 are clamped in a slit in base sheet 1 and are also interlocked with fibers of base sheet 2'.

Referring now to Fig. 10, numeral 5 has been applied to indicate a roll of sheet rubber or the like elastomer and reference numeral 6 has been applied to indicate a rolled up web of loosely interlocked fibers. The base sheet drawn from roll 5 has been indicated by reference numeral 1 and the web drawn from roll 6 has been indicated by reference numeral 2. As shown web 2 is being superimposed upon base sheet 1 and both materials are jointly fed into the nip formed between a pair of co-operating rotatable rolls 7, 8. Thereupon web 2 and base sheet 1 are jointly moved through a needle loom diagrammatically indicated at N, where web 2 is being attached to base sheet 1 by the action of the barbs of the needle loom.

If desired the process may be repeated, i.e. a similar second porous web may be superimposed upon the reverse side of the base sheet 1, i.e. on the side thereof not occupied by the first web. Thereupon the second web, the base sheet and the first web are being jointly fed to the nip formed between rolls 7, 8 and further passed through needle loom N where all three layers are integrated by the action of its barbs into a laminate which is fiber-lined on both sides.

The product so obtained tends to differ from other fiber-lined materials having a rubber base in that the use of more or less stretchable, or crinkled, or cork-screw-shaped fibers is conducive to a relatively high degree of fluffiness.

While the invention has been described according to preferred embodiments and the manner of carrying out the process, it will be understood that changes and modifications may be made therein without departing from the spirit or scope of the invention, and it is intended in the appended claim to cover such possible changes and modifications.

What is claimed as new and desired to be secured by Letters Patent is:

An elastic stretchable non-woven laminate comprising a stretchable base sheet of an elastomer, said base sheet having a first system of perforations involving a removal of material from said base sheet at a plurality of spaced points thereof thus rendering said base sheet substantially pervious, said base sheet further having a second system of perforations at a second plurality of spaced points thereof without involving removal of base sheet material therefrom, said second system of perforations being in the form of a plurality of small slits, a lining layer of relatively loose interlocked fibers superimposed upon said base sheet and attached to said base sheet by means of said second system of perforations by insertion of fibers of said lining layer into said plurality of small slits and clamping said fibers in said slits, the density of said second system of perforations being sufficiently high to combine said base sheet and said lining layer into an integral laminate; the constituent fibers of said lining layer other than those directly attached to said base sheet being indirectly attached to said base sheet by interlocking with fibers directly attached to said base sheet, the fibers of said lining layer being sufficiently stretchable to permit joint stretching of said base sheet and of said lining layer with concomitant increase of the spacing of said second plurality of points, and said laminate being devoid of any matter substantially limiting the stretchability inherent in said base sheet and in said lining layer.

References Cited in the file of this patent

UNITED STATES PATENTS

| | | |
|---|---|---|
| 46,837 | Waite | Mar. 14, 1865 |
| 430,230 | Grubb | June 17, 1890 |
| 1,742,338 | Bettison | Jan. 7, 1930 |
| 2,429,486 | Reinhardt | Oct. 21, 1947 |